May 20, 1941.    J. C. HOLDGATE ET AL    2,242,887
SCRAP CHOPPER FOR EDGE TRIMMING SHEARS
Filed May 15, 1939    5 Sheets-Sheet 1

INVENTORS
John C. Holdgate,
William P. Donald
and Donald A. McArthur
by their attorneys
Stebbins, Blenko & Parmelee

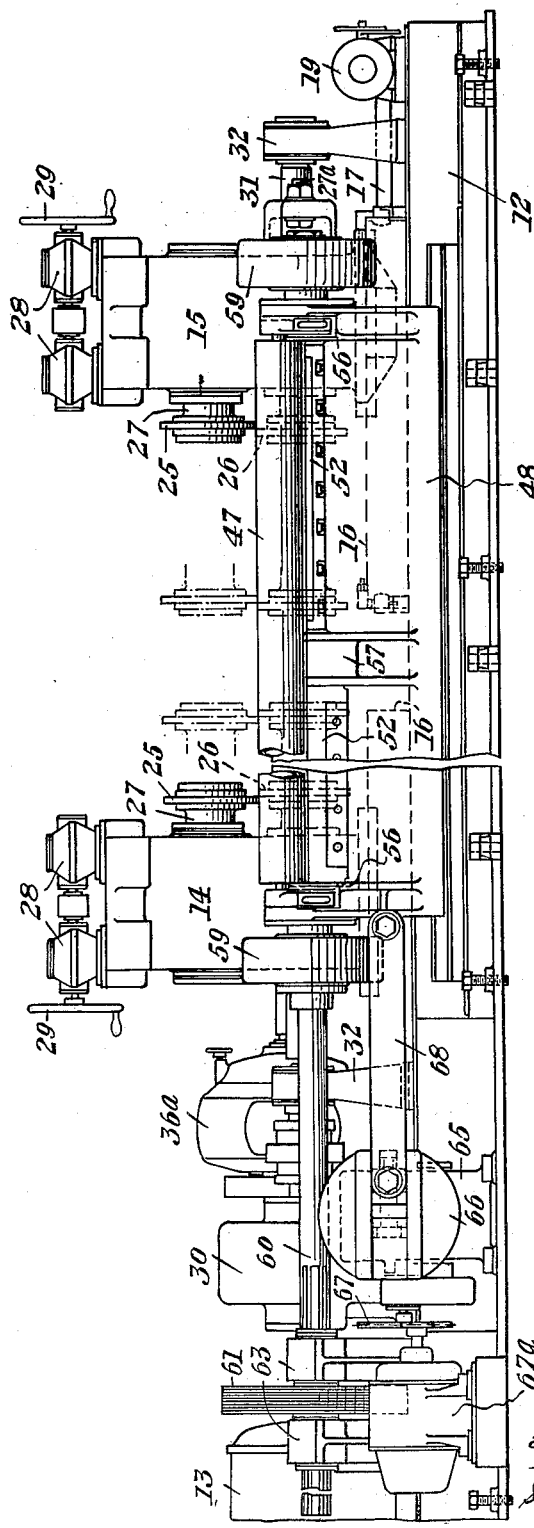

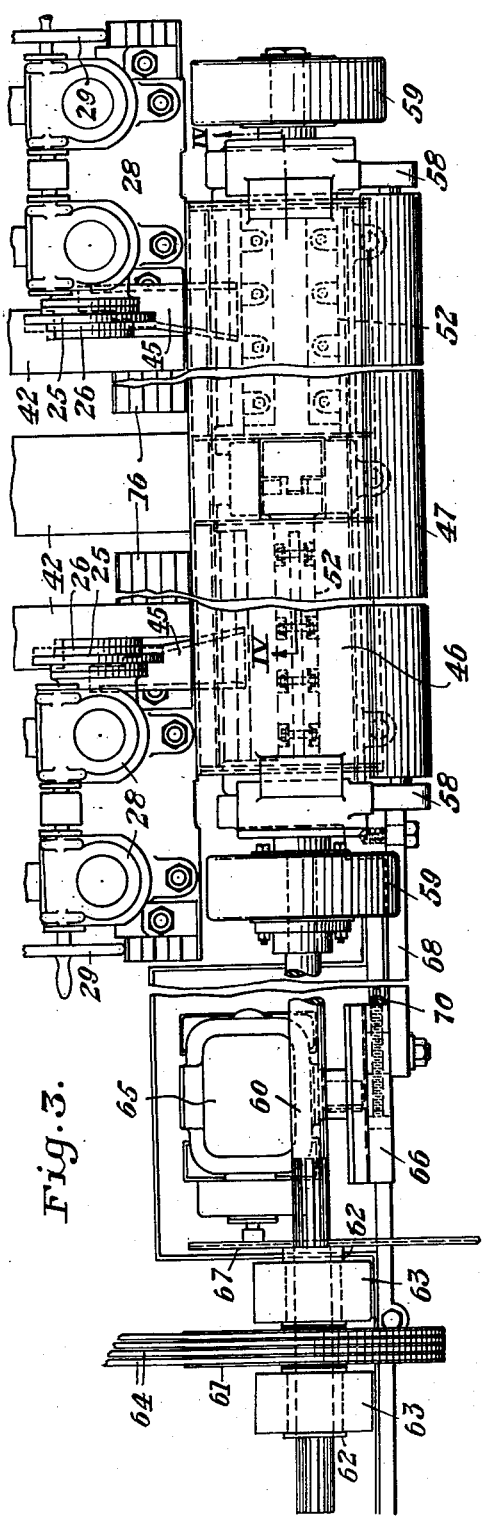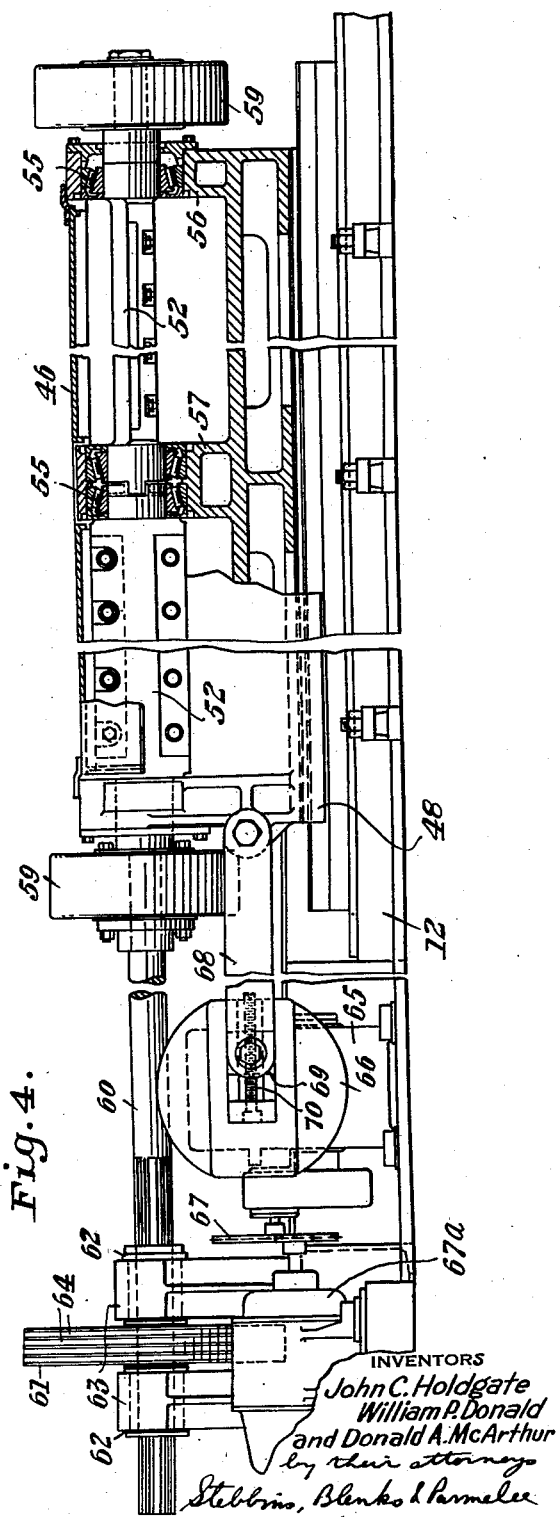

May 20, 1941.　　J. C. HOLDGATE ET AL　　2,242,887
SCRAP CHOPPER FOR EDGE TRIMMING SHEARS
Filed May 15, 1939　　5 Sheets-Sheet 4

INVENTORS
John C. Holdgate
William P. Donald
and Donald A. McArthur
by their attorneys
Stebbins, Blenko & Parmelee

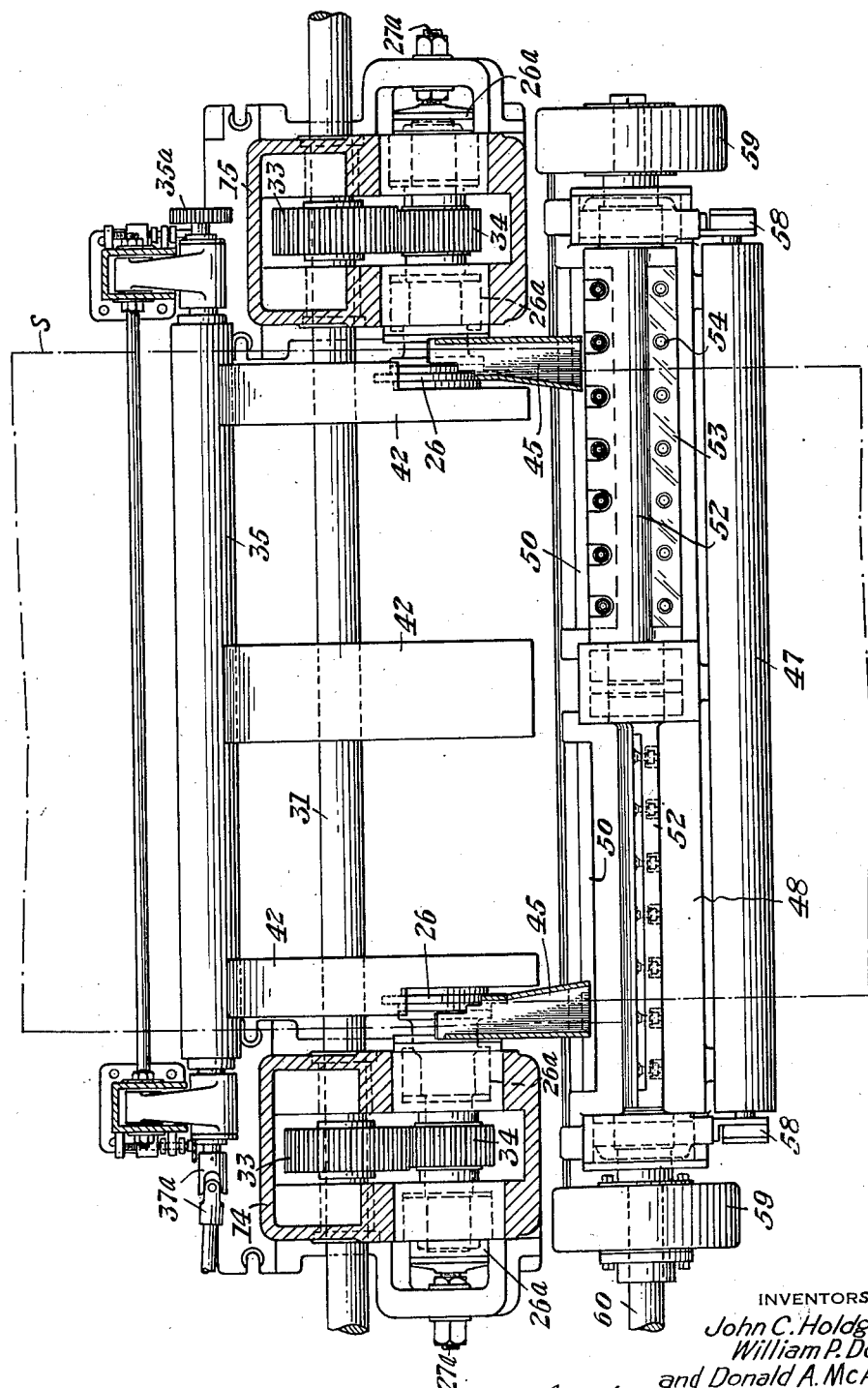

Patented May 20, 1941

2,242,887

UNITED STATES PATENT OFFICE

2,242,887

SCRAP CHOPPER FOR EDGE TRIMMING SHEARS

John C. Holdgate, William P. Donald, and Donald A. McArthur, Warren, Ohio, assignors to The Wean Engineering Company, Warren, Ohio, a corporation of Ohio Application May 15, 1939, Serial No. 273,696

3 Claims. (Cl. 164—10.6)

This invention relates to a shear for cutting into short lengths the portions trimmed from the edges of strip as the latter is sheared to specified width.

Shears have been known heretofore for cutting the edge portions removed from strip as it is slit to size but have been characterized by numerous objections. In the first place, it has been found necessary to change the shear knives frequently and re-grind them before further use. The cooperating cutting edges of prior shears, furthermore, have not been so disposed as to produce the best cutting action. Further problems are presented by the necessity for handling greater and greater widths of strip, as the apparatus used heretofore has not been applicable with the utmost satisfaction to the handling of maximum widths of strip.

We have invented a shear for chopping into lengths the ribbon of scrap produced when strip is sheared to width, which avoids the aforementioned objections and is characterized by further features of marked advantage which will be referred to more fully in the subsequent detailed description.

Briefly stated, our invention comprises a rotary knife holder journaled in suitable bearings having shear blades mounted thereon for cooperation with relatively fixed shear blades. The scrap chopper is located adjacent the edge trimming shear and is preferably driven by the same power source as the latter. The entire scrap chopping mechanism is mounted for movement in a direction perpendicular to the travel of the strip being sheared, whereby different portions of the cooperating cutting edges may be successively presented to the scrap ribbons, thus prolonging the period of satisfactory service between re-grindings.

The following detailed description of the invention briefly outlined above refers to the accompanying drawings for an illustration of a typical embodiment thereof. In the drawings:

Fig. 2 is a front elevation of the scrap chopper showing the edge trimming shear as well;

Fig. 3 is a plan view of the scrap chopper itself, to enlarged scale, showing parts only of the edge trimming shear;

Fig. 4 is a view partly in elevation and partly in section along the line IV—IV of Fig. 3, showing the scrap chopper apart from the edge trimming shear;

Fig. 7 is a sectional view through the edge trimming shear along the plane of line VII—VII of Fig. 5, showing the scrap chopper in plan.

Figure 1:
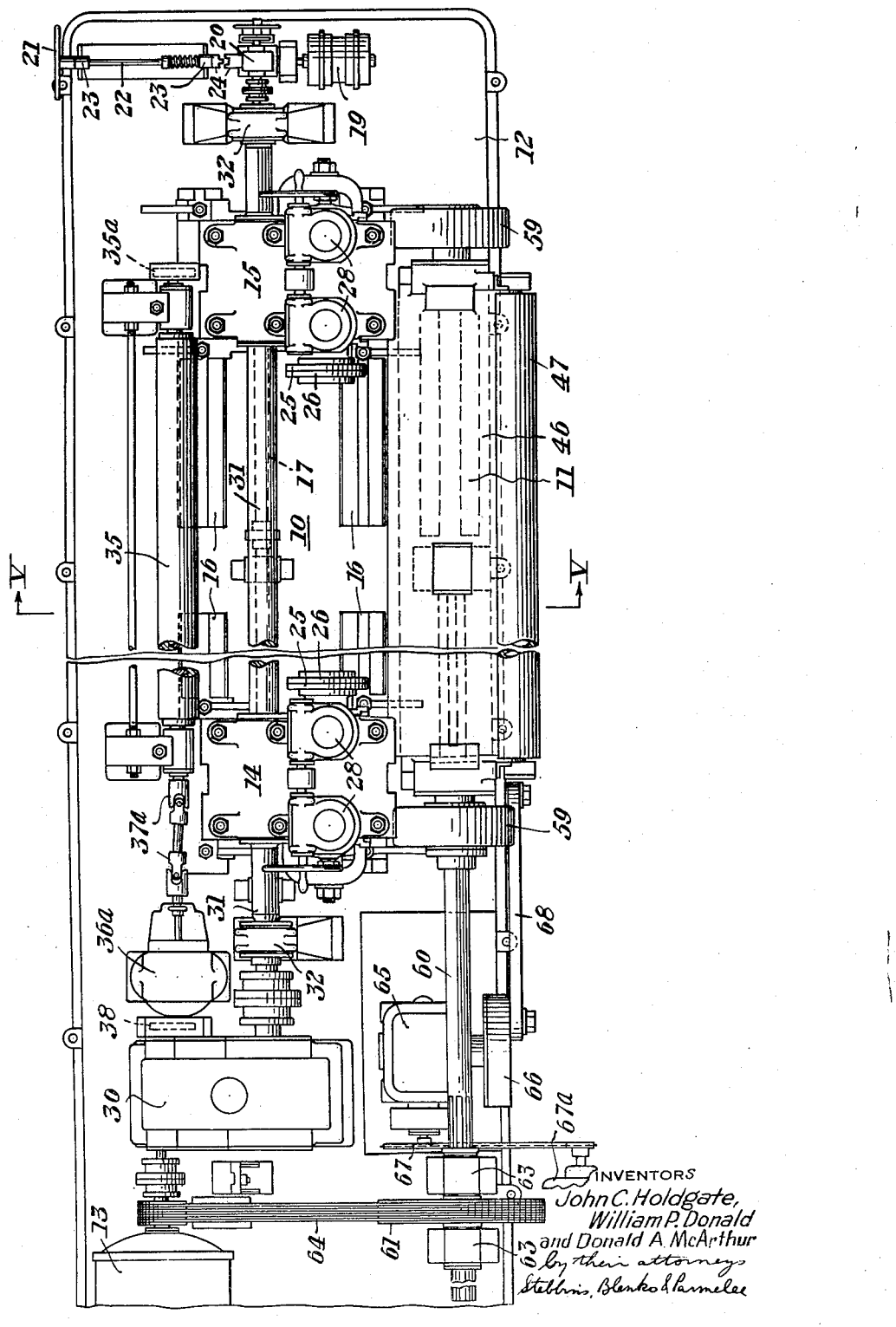
Fig. 1 is a plan view of the edge trimming shear and scrap chopper, parts being omitted for clearness.

Referring now in detail to the drawings, the edge trimming shear is indicated generally in Fig. 1 at 10 and the scrap chopper at 11. Both are mounted on a common fabricated base 12 which may be secured to any suitable foundation (not shown). Both the edge trimming shear and the scrap chopper, furthermore, are driven by the same power source, viz., a motor 13 mounted on the base 12.

Figure 5:
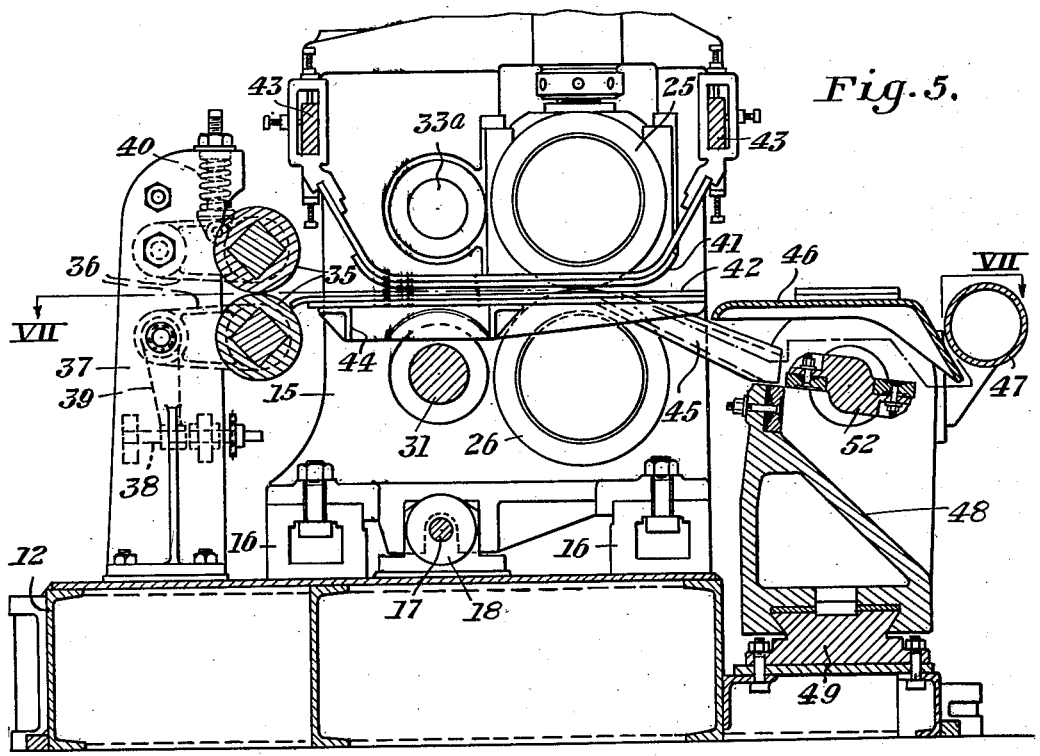
Fig. 5 is a transverse sectional view through the edge trimming shear and scrap chopper taken substantially along the plane of line V—V of Fig. 1.

The edge trimming shear 10 comprises principally a pair of housings 14 and 15 slidably supported on transverse rails 16 secured to the base 12. The housings 14 and 15 may be adjusted toward or from the center-line of the strip being trimmed (indicated in dotted lines at S, Fig. 7) by a transverse screw shaft 17 (Fig. 5). This shaft has right and left hand threads adjacent opposite ends which traverse nuts 18 secured to the bottoms of the housings. A motor 19 mounted on the base 12 is adapted to drive the shaft 17 through a speed-reducing gear 20. The shaft 17 may also be operated manually by a hand wheel 21 on a shaft 22. The shaft 22 is journaled in bearings 23 on the base 12 and is adapted to be connected by a clutch 24 to the high speed shaft of the reducer 20.

Each of the housings 14 and 15 is provided with upper and lower disk cutters 25 and 26. The disk cutters are mounted on arbors 27 journaled in bearings mounted in the housings. The bearings 26a (Fig. 7), supporting the arbors on which the cutters 26 are mounted, are fixed vertically, resting on shims whereby the desired elevation is obtained, but may be adjusted laterally by screws 27a. The bearings on which the arbors supporting the cutters 25 are journaled may be adjusted vertically by means of screw-downs 28 operated manually by hand-wheels 29. The cutters 25 and 26 are removably mounted on their respective arbors to facilitate re-grinding.

The motor 13 drives the arbors 27 through a speed-reducing gearing 30 and a drive shaft 31 journaled in bearings 32 mounted on the base 12. Gears 33 splined on the shaft 31 drive pinions 34 on their lower arbors 27. The gears 33 also mesh with similar gears on shafts 33a journaled in the housings 14 and 15. The gears on the shaft 33a mesh with pinions on the upper arbors 27 similar to the pinions 34. The maximum vertical adjustment of the upper arbors 27 required to maintain the cutters 25 and 26 in proper cooperative relation is quite small so it does not materially affect the meshing of the driving gears. As shown in Fig. 5, the shafts 33a are fixed and do not move with the bearings supporting the upper arbors.

Pinch rolls 35 on the entrance side of the edge trimming shear are journaled in arms 36 pivoted on standards 37 secured to the base 12. The rolls 35 are of suitable composition, i. e., felt or flannel, and comprises a shell formed on a central bar or shaft of metal which provides journals for the rolls. The lower arms 36 may be angularly adjusted by screw shafts 38 journaled in suitable bearings on the standards 37. The shafts 38 are threaded through nuts movably mounted in the ends of crank arms 39 secured to the lower arms 36. The upper arms 36 are constantly urged downwardly by an adjustable spring abutment of known type indicated generally at 40. The rolls 35 are geared together as at 35a (Fig. 1) and are driven by the motor 13 through an infinitely variable speed-reducer 36a and universal joints 37a. The speed-reducer 36a is connected to the high speed shaft of the reducer 30 by a chain drive 38a. The infinitely variable reducer 36a permits the speed of the pinch rolls to be so controlled relative to the speed of the knives 25 and 26, so that the peripheral speed of both is the same regardless of changes in the diameter of pinch rolls and edge trimming cutters.

The strip to be trimmed is confined as it passes through the trimming shear, between upper and lower guide rails 41 and 42 as shown in Fig. 5. These parts are omitted from Figs. 1 and 2, for clearness. The upper guide rails 41 are supported on cross bars 43 extending between the housings 14 and 15 and releasably secured thereto when the housings have been properly adjusted relative to the center-line of the strip. The lower rails 42 are secured to angle bars 44 supported on the base 12.

Scrap chutes 45 are mounted on the housings 14 and 15 and extend forwardly and downwardly from the nips of the cutters 25 and 26. When properly started, the ribbons trimmed from the edges of the strip are deflected downwardly by the chutes 45 to the scrap chopper 11 while the strip itself moves on over an apron plate 46 and a guide roll 47 carried on the scrap chopper.

The scrap chopper 11 comprises a main blade-holding casting 48 dove-tailed to and slidable on a guide block 49 secured to the base 12. Fixed shear blades 50 are secured to the casting 48 by bolts 51, being adjusted horizontally thereof by shims 50a.

Rotors 52 having shear blades 53 secured thereto by bolts 54 are journaled in bearings 55 (Fig. 4) mounted in housings 56 and 57 formed in the casting 48. The bearings 55 are of the tapered roller type and are adjustable in the known manner to maintain a constant running clearance so that the desired clearance between the edges of the fixed and rotary shear blades may be obtained at all times despite wear in the bearings. The rotors 52, at their inner ends, have interfitting tongue and slot portions locking them together for rotation as a unit. Either rotor, however, may be removed independently of the other. As shown in Fig. 4, the apron plate 46 is supported on the bearing housings 56 as are the bearing brackets 58 in which the guide roll 47 is journaled. A fly-wheel 59 is mounted on the outer end of each rotor 52.

The rotors 52 are driven by a shaft 60. A pulley 61 has sleeves 62 journaled in bearings 63 on the base 12 and the sleeves 62 are splined to the shaft 60, thus permitting axial movement of the latter relative to the bearings 63. The pulley 61 is driven by V-belts 64 from a pulley on the shaft of motor 13.

A speed-reducer 65 has a slow-speed shaft provided with a crank disk 66. The reducer 65 is driven through a chain and sprocket drive 67 by a motor 67a. A pitman 68 is pivoted to the casting 48 and to a block 69 adjustable radially on the disk 66 by a screw 70.

By virtue of the construction just described, the scrap chopper as a whole may be reciprocated slowly along the guide block 49 by operating the motor 67a.

Figure 6:
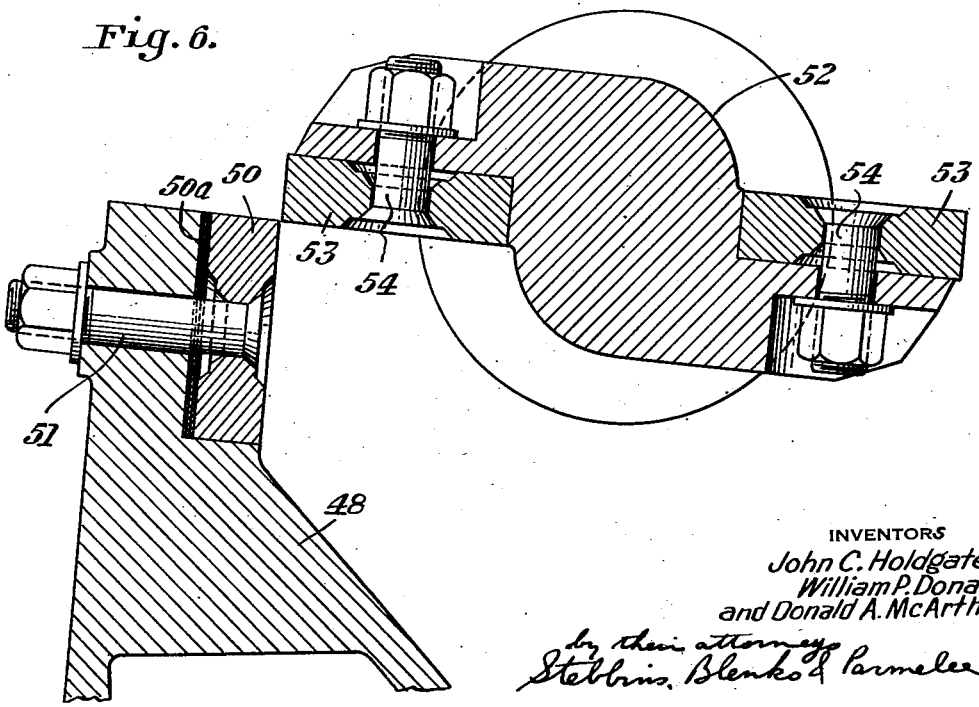
Fig. 6 is a partial sectional view taken along the same plane as Fig. 5, showing a portion of the latter to enlarged scale.

The operation of the apparatus described in detail above requires little further explanation. The strip to be trimmed is fed between the guide rolls 35 and the rails 41 and 42. The edge portions thereof are sheared off by the cooperation of the cutters 25 and 26 and guided downwardly by the chutes 45 to the fixed blades 50. The rotor blades 53, being driven counter-clockwise as viewed in Figs. 5 and 6, sever the ribbons of scrap into short lengths which can be conveniently disposed of. The remainder of the strip moves steadily forward over the apron plate 46 and guide roll 47.

The motor 67a may be controlled in any convenient manner. It may be operated under manual control or by suitable means, may be caused to start when the edge trimming cutters are stopped. It may also be desirable to control the motor 67a so that it will operate only a short time in any case, to produce a slight adjustment of the casting 48 along the block 49.

The provision of a separate motor for driving the blade oscillating mechanism is particularly advantageous for the reason that if it is attempted to shift the chopper blades longitudinally while strip is being trimmed, there is a tendency for the roller 47 to shift the strip out of its normal path.

The invention is characterized by numerous advantages over similar apparatus as known heretofore. Among these advantages is the fact that the edges of the knives 50 and 53 engage at an angle such that the cutting surfaces are actually parallel which is the ideal relation for clean shearing and is similar to the action of the ordinary guillotine shear. At the same time, the arrangement of the blades is such that the rear edges of the rotor blades have ample clearance relative to the outer edge of the fixed blade. All the blades are accurately rectangular in section so they may be ground on all four edges and reversed when one edge is worn.

As already stated, the slow reciprocation of the scrap chopper transversely of the direction of movement of the strip also prolongs the period of service obtainable from the blades between re-grindings. In actual operation, the scrap chopper disclosed herein has worked satisfactorily for two or three weeks without requiring any grinding or the reversal of a single blade, whereas it was formerly common practice to grind or reverse the blades every eight hours or even every four hours. The reduction in the frequency of re-grinding which is accomplished by the invention is the result of the angular relation of the surfaces of the cutting blades and the reciprocation thereof across the line of travel of the strip.

A further advantage of the invention is the type and arrangement of the bearings for the rotors as well as the use of two independent rotors mechanically interlocked for rotation as a unit. This construction is particularly advantageous in trimming wide strip. A further advantage arises from the fact that the rotors are driven by the same power source as the edge trimming shears. By this arrangement, the rotors operate only when the edge trimming shears are functioning. This avoids the undesirable results which have heretofore been experienced from the continued operation of a scrap chopper after stopping the edge trimming shears, i. e., the tendency of the continued impact of the chopper blades on the end of the scrap ribbon to tear the latter from the main body of the strip.

The use of a belt drive is a further advantage since it permits slippage in case the rotor blades should engage the scrap ribbons on starting up, before attaining sufficient momentum to insure a clean cut. This permissive slipping avoids excessive stresses which would result if the rotors were positively driven.

In addition to the foregoing advantages, the apparatus disclosed is relatively simple in construction, highly efficient in operation, and requires only routine maintenance to assure a long useful life.

Although we have illustrated and described but a preferred embodiment of the invention, it will be recognized that changes in the construction illustrated may be made without departing from the spirit of the invention or the scope of the appended claims.

We claim:

1. Apparatus for shearing to length a plurality of strips comprising a relatively stationary blade holder, a pair of axially alined rotors journaled in bearings in said blade holder, a separable driving connection between said rotors, a cutting blade secured in said holder, and a cooperating cutting blade secured in one of said rotors.

2. Apparatus for shearing to length a plurality of strips comprising a relatively stationary blade holder, a pair of axially alined rotors, a pair of bearings in said holder for rotatably supporting each rotor, a separable driving connection between said rotors, a cutting blade secured in said holder, and a cooperating cutting blade secured in one of said rotors.

3. Apparatus for use with an edge-trimming shear including rotary cutters for removing the edges of a traveling strip and a motor for driving the cutters, said apparatus comprising a relatively fixed shear blade extending transversely of the path of the strip, a rotary shear blade cooperating with said relatively fixed blade, common mounting means for said blades, means for adjusting said mounting means transversely of said path, a member on said mounting means over which the trimmed strip passes and a second motor for driving said adjusting means whereby the latter may be actuated when the edge-trimming shear is stopped.

JOHN C. HOLDGATE.
WILLIAM P. DONALD.
DONALD A. McARTHUR.